United States Patent
Lasaruk et al.

(10) Patent No.: US 10,554,951 B2
(45) Date of Patent: Feb. 4, 2020

(54) METHOD AND APPARATUS FOR THE AUTOCALIBRATION OF A VEHICLE CAMERA SYSTEM

(71) Applicant: Conti Temic microelectronic GmbH, Nuremberg (DE)

(72) Inventors: Aless Lasaruk, Lindau (DE); Felix Hachfeld, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/361,586

(22) Filed: Mar. 22, 2019

(65) Prior Publication Data

US 2019/0297314 A1    Sep. 26, 2019

(30) Foreign Application Priority Data

Mar. 22, 2018  (DE) .......... 10 2018 204 451

(51) Int. Cl.
*H04N 13/246* (2018.01)
*G06K 9/00* (2006.01)
*H04N 17/00* (2006.01)

(52) U.S. Cl.
CPC ....... *H04N 13/246* (2018.05); *G06K 9/00791* (2013.01); *H04N 17/002* (2013.01)

(58) Field of Classification Search
CPC . H04N 13/246; H04N 17/002; G06K 9/00791
See application file for complete search history.

(56) References Cited

U.S. PATENT DOCUMENTS 6,130,706 A * 10/2000 Hart, Jr. ............ B60T 8/172
   348/148
7,684,945 B2   3/2010 Walter et al.
(Continued)

FOREIGN PATENT DOCUMENTS

EP    2 618 305     4/2014
EP    2 010 419    10/2016
WO   WO 2017/206999   12/2017

OTHER PUBLICATIONS

German Office Action for German Patent Application No. 10 2018 204 451.1, dated Feb. 1, 2019, 12 pages, German Patent and Trademark Office, Muenchen, Germany, with partial English translation, 9 pages.

(Continued)

*Primary Examiner* — Jefferey F Harold
*Assistant Examiner* — Mustafizur Rahman
(74) *Attorney, Agent, or Firm* — W. F. Fasse

(57) ABSTRACT

A method for autocalibration of a (monocular) vehicle camera has the following steps:
  a) acquiring from the vehicle camera (1), a series of images of a region of the surroundings in front of the vehicle,
  b) detecting a cornering maneuver (25) of the vehicle suitable for autocalibration, when the curve radius (21) described by the vehicle is less than or equal to a maximum radius and the traversed curve angle (22) is greater than or equal to a minimum angle, and
  c) performing autocalibration, when at least one cornering maneuver (25) has been identified as suitable for autocalibration, wherein the autocalibration takes account of movement of stationary objects in the surroundings of the vehicle in the image sequence or sequences of (Continued)

Figure 1:
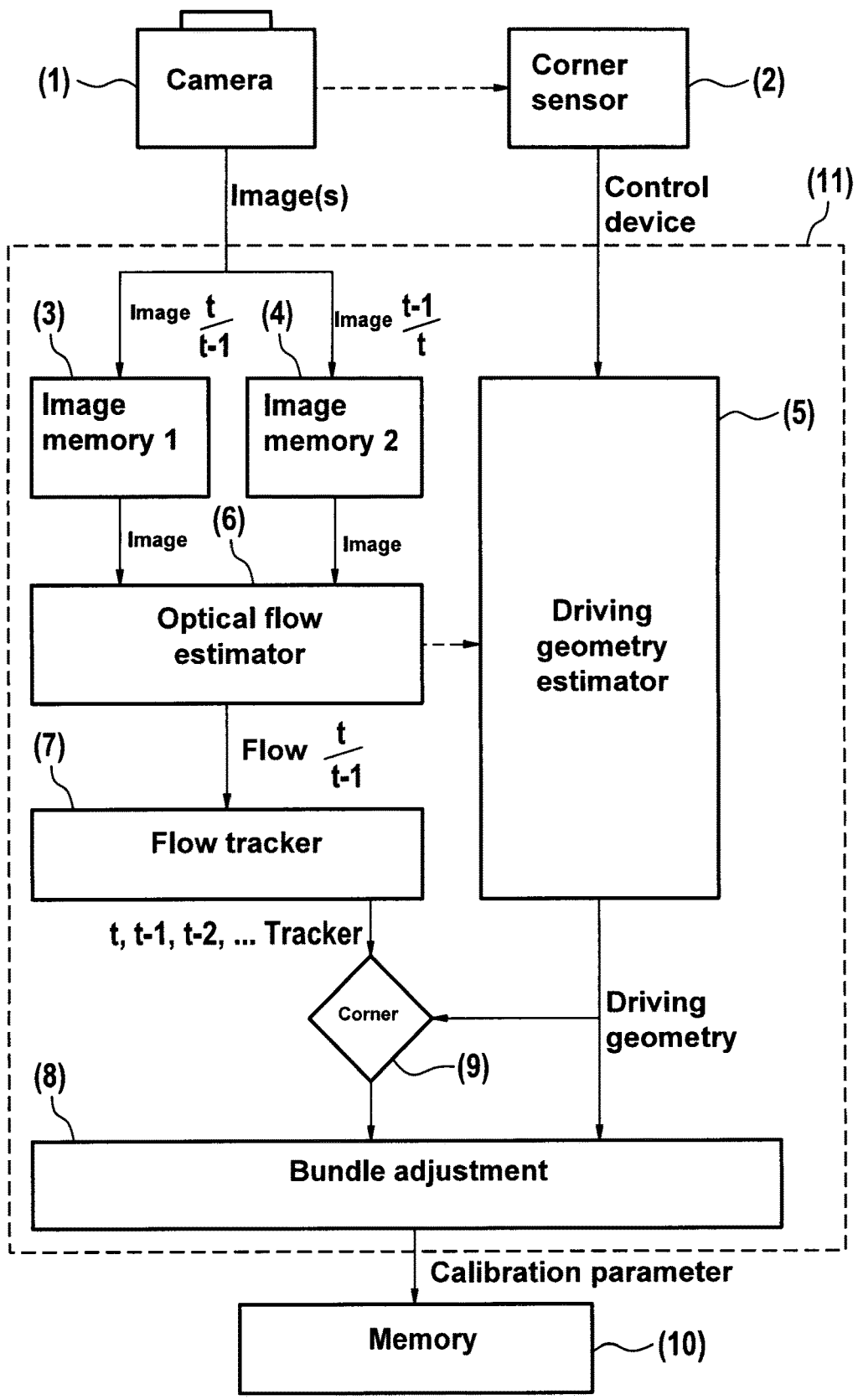

one or more cornering maneuvers (25) suitable for autocalibration. An autocalibration apparatus is also provided.

15 Claims, 2 Drawing Sheets

(56) References Cited

U.S. PATENT DOCUMENTS

| | | | |
|---|---|---|---|
| 9,262,828 B2 | 2/2016 | Pflug et al. | |
| 9,516,277 B2* | 12/2016 | Zhang | G06K 9/00798 |
| 9,794,552 B1* | 10/2017 | Ribble | H04N 17/002 |
| 2004/0061596 A1* | 4/2004 | Egami | B62D 15/0265 |
| | | | 340/425.5 |
| 2009/0125181 A1* | 5/2009 | Luke | B60C 23/061 |
| | | | 701/36 |
| 2009/0290032 A1* | 11/2009 | Zhang | B60R 1/00 |
| | | | 348/211.9 |
| 2010/0165102 A1* | 7/2010 | Klebanov | B60Q 1/115 |
| | | | 348/135 |
| 2010/0172542 A1* | 7/2010 | Stein | G06K 9/00798 |
| | | | 382/103 |
| 2010/0201814 A1* | 8/2010 | Zhang | G06K 9/4647 |
| | | | 348/148 |
| 2010/0220173 A1* | 9/2010 | Anguelov | H04N 5/23238 |
| | | | 348/36 |
| 2012/0176492 A1* | 7/2012 | Garin | H04N 7/18 |
| | | | 348/116 |
| 2014/0347486 A1* | 11/2014 | Okouneva | G06T 7/0004 |
| | | | 348/148 |
| 2015/0092058 A1 | 4/2015 | Bone et al. | |
| 2015/0145965 A1 | 5/2015 | Livyatan et al. | |
| 2018/0068459 A1 | 3/2018 | Zhang et al. | |
| 2018/0082133 A1* | 3/2018 | Guarneri | G06T 7/246 |

OTHER PUBLICATIONS

Thao Dang et al., "Self-Calibration for Active Automotive Stereo Vision", Intelligent Vehicles Symposium, IEEE, Jun. 13, 2006, Tokyo, Japan, pp. 364 to 369.

Wikipedia, "Bündelblockausgleichung" (Bundle Block Compensation), Jul. 31, 2017, URL: https://de.wikipedia.org/w/index.php?title=B%C3%BCndelblockausgleichung&oldid=167758956, retrieved on Jan. 25, 2019.

Richard Hartley et al., "Multiple View Geometry in Computer Vision", Second Edition, Cambridge University Press, 2000, ISBN: 0521623049, 48 pages.

Peter Sturm, "Critical Motion Sequences for Monocular Self-Calibration and Uncalibrated Euclidean Reconstruction", IEEE Conference on Computer Vision and Pattern Recognition, CVPR 1997, Jun. 1997, pp. 1100-1105 (reprint 10 pages).

Changchang Wu, "Critical Configurations for Radial Distortion Self-Calibration", IEEE Conference on Computer Vision and Pattern Recognition, CVPR 2014, 8 pages.

* cited by examiner

METHOD AND APPARATUS FOR THE AUTOCALIBRATION OF A VEHICLE CAMERA SYSTEM

FIELD OF THE INVENTION

The invention relates to a method and an apparatus for the autocalibration of a vehicle camera, which may be used in particular in the vehicle as a sensor system for driver assistance systems and automated driving.

BACKGROUND INFORMATION

Camera calibration is an essential part of the surroundings detection of a driver assistance system (ADAS: Advanced Driver Assistance Systems) performed by a camera system moved by the vehicle. In this case, the parameters of a formal relationship (projection) between three-dimensional spatial points and corresponding pixels of a physical camera system are determined, e.g. by an estimation method. The determined parameters are then stored in the ADAS system for further use. The projection specification contains a description of the light propagation paths within the optical system of the camera (intrinsic parameters) and the position and orientation relative to a fixedly referenced coordinate system on the vehicle (extrinsic parameters). With the above data, measuring detection of the spatial surroundings of the vehicle using a structure-from-motion (SFM) or multi-view method is possible during travel.

SUMMARY OF THE INVENTION

Known camera calibration methods belonging to ADAS systems comprise a plurality of steps performed by different actors. These include camera calibration by the camera manufacturer at the end of the camera production line, by the vehicle manufacturer at the end of the vehicle production line, and autocalibration of the camera during travel. The first calibration serves as an initial solution or as the basis for the two further steps and is thus the most important basis for robust vehicle environment detection.

Typically, at the end of the camera production line camera parameters are estimated from captured images of one or more patterns (targets) with known spatial geometry. Calibration theory requires the targets to be positioned precisely in the region within which the camera is subsequently to detect the surroundings. The working range of a typical ADAS camera system amounts, however, to about 6-100 m. Due to lack of space and the associated costs for the camera factory, structures with an area of several hundred square meters are not feasible for calibration purposes. To solve the problem, in camera manufacture highly precisely produced target patterns are used at a distance of around 1-5 m. The precision or size requirements for the manufacture of the target patterns result from derived calibration quality requirements over greater distances. Simulations and experiments in this case provide indications as to the exact size or orientation of the patterns. It makes sense to note that reducing the size of the targets or distances is not possible without major effort due to out-of-focus artifacts.

The camera calibration systems arising as described above are very costly and difficult to maintain. Due to changes in the position of the targets and the surface finish thereof as a result of environmental influences, the process of calibrating ADAS systems is one of the most error-prone and cost-intensive aspects of camera manufacture. The wider use of wide-angle and telephoto lenses in the ADAS field makes the problem significantly greater, since these lenses require still greater manufacturing areas or target production accuracy. The use of standard solutions, as described above, is thus no longer cost-effective.

This is made still more difficult by the fact that the intrinsic camera parameters determined during manufacture are susceptible to temperature influences, humidity, and camera system vibrations. It is technically very difficult to ensure that the camera parameters remain constant over the lifetime of the camera. Recalibration of the intrinsic parameters is thus necessary.

EP 2010419 B1 discloses a method for calibration of a yaw rate measurement in a motor vehicle with a forward pointing camera system. For high accuracy detection of the yaw angle, at least one first calibration of the measured yaw rate is performed at a standstill and at least one second calibration is performed while the vehicle is traveling straight ahead. Using the indicators vehicle speed, radius of curvature of a predicted vehicle trajectory and a traffic lane determined from camera image data, it is possible to derive whether the vehicle is currently traveling straight ahead.

WO 2017/206999 A1 discloses a method for image evaluation of image data from a vehicle camera, in which an extracted feature is determined as an outlier if the reprojection error of this feature reaches or exceeds a feature-dependent threshold. The movement of the vehicle camera may be reconstructed thereby and used for calibration of the vehicle camera.

One object which the invention is intended to achieve is simplification of the overall camera calibration process. This is preferably achieved in that the high precision calibration does not take place at the end of the line but rather dynamically in the vehicle during travel, with continuous improvement.

A method according to the invention for the autocalibration of a (monocular) vehicle camera has the following steps:

a) acquiring a series of images from the vehicle camera, wherein the vehicle camera maps a region of the surroundings in front of the vehicle, b) detecting a cornering maneuver of the vehicle (i.e. curve travel of the vehicle along a curved path) suitable for autocalibration, if the curve radius described by the vehicle is less than or equal to a (defined or predetermined) maximum radius and the curve angle covered is greater than or equal to a (defined or predetermined) minimum angle, c) performing autocalibration, if at least one cornering maneuver i.e. curve travel has been identified as suitable for autocalibration, wherein d) the autocalibration takes account of movement of stationary objects in the surroundings of the vehicle in the image sequence or in the image sequences of one or more cornering maneuvers i.e. curve travels suitable for autocalibration.

The term "stationary object" should here be understood very broadly to mean stationary parts of the surroundings, such as e.g. (two-dimensional) lane markings, symbols on a plane, patterns, textures, traffic signs and other raised or three-dimensional objects.

Ideally, for autocalibration the vehicle camera solely detects stationary parts of the surroundings. In reality, this is seldom the case. The images should however contain a minimum proportion of stationary parts of the surroundings.

The basis of autocalibration is thus in particular image information which is obtained during one or more "suitable" cornering maneuvers(i.e. curve travels of the vehicle along curved paths). In particular, inherent camera motion or camera parameters may be reconstructed on the basis of the movement of stationary objects in the image. Whether a cornering maneuver of the vehicle is suitable for autocalibration depends in particular on the (approximated) curve radius and the curve angle covered (of the approximated segment of a circle). This is verified by a method for estimating curve radius and curve angle.

Autocalibration may be performed after each completed suitable cornering maneuver. However, a plurality of suitable cornering maneuvers can also be "collected" (or the associated information stored) and autocalibration performed only once a given number of suitable cornering maneuvers is reached. If a plurality of suitable cornering maneuvers are taken into account, the determined magnitudes may be included, preferably weighted and averaged, in the autocalibration.

The invention in other words comprises an apparatus and a method for estimating the full set of calibration parameters of an ADAS camera system during vehicle travel. A significant advantage consists in the fact that no highly precisely produced targets are necessary for calibration. The method uses the motionless part (stationary objects, including textures on the surrounding surface), located in front of the vehicle, of the (unknown) traffic scenarios for intrinsic (and naturally also still for extrinsic) calibration. To achieve this mathematically, a camera model is preferably needed with non-vanishing (e.g. radial) distortions. Furthermore, data acquisition and the start of calibration are only performed during specific cornering maneuvers. As a result of these two characteristics, a calibration quality comparable to industrial standards (using targets at the end of the camera production line) may be achieved after just a few measurements.

The process of calibrating an ADAS camera system during camera production can be greatly simplified.

The invention is based on the finding or assumption that very good autocalibration is possible during a cornering maneuver with a sufficiently small radius and sufficiently large covered angle of a generalized pinhole camera with non-vanishing radial distortions using a bundle adjustment method. Experimental results on the basis of image data from urban and cross-country driving confirm these findings or assumptions.

The method is advantageously designed such that the necessary data for initializing the bundle adjustment algorithm with a good starting solution are provided. The results of many cornering maneuvers may lead, through filtering, to a considerable improvement in accuracy, which may compete with that of conventional manufacturing calibration using calibration targets.

The invention thus advantageously allows considerable simplification of test systems in camera manufacture. The camera production process is simplified enormously and made less expensive by the markedly lower calibration effort at the end of the camera production and vehicle production lines.

According to one preferred embodiment, in step d) the autocalibration proceeds on the assumption of level movement of the vehicle camera. This is the case in particular if the vehicle performs an unaccelerated movement on a level carriageway surface.

The autocalibration preferably includes the use of a bundle adjustment method.

The vehicle camera preferably has an optical system which is configured such that during mapping of the vehicle's surroundings (radial) distortions occur which do not fall below a predefined magnitude (or intensity). In particular, the camera model used in the autocalibration method (e.g. bundle adjustment) should have sufficiently large parameter values for the (radial) distortion.

The autocalibration preferably supplies intrinsic and extrinsic vehicle camera parameters, or an update (i.e. corrections) to the (currently estimated) parameters already present. By way of example, suitable intrinsic parameters are focal length(s), principal point and distortion coefficients. Typical extrinsic parameters are yaw, pitch and roll angles and the position of the camera in a system of reference coordinates (e.g. position of the first view).

The maximum radius for detection of a cornering maneuver suitable for autocalibration preferably amounts to 40 meters. The minimum angle preferably amounts to 60° or 90°. A turning-off operation at an intersection thus for example constitutes a suitable cornering maneuver.

Whether the vehicle camera moves (sufficiently) in a plane over the course of the (cornering) maneuver may be verified according to one advantageous embodiment by taking account of the pitch and/or roll of the vehicle camera or of the vehicle.

Cornering maneuver detection (detection of a cornering maneuver suitable for autocalibration) and optionally also pitch and/or roll detection may preferably proceed on the basis of evaluation of the image sequence.

Alternatively or in addition, the cornering maneuver detection and optionally also pitch and/or roll detection may proceed on the basis of vehicle sensor data.

The invention further relates to an apparatus (e.g. a control device) for the autocalibration of a vehicle camera. The apparatus may be e.g. a (camera) control device for calculating the calibration which has been installed (such as the vehicle camera) in a vehicle.

An input unit is configured to receive and provide (store, supply to image evaluation units) a sequence of images acquired by the vehicle camera of a region of the surroundings in front of the vehicle.

A driving geometry estimating unit is configured to identify a vehicle cornering maneuver suitable for autocalibration. A cornering maneuver suitable for autocalibration is present when the curve radius described by the vehicle is less than or equal to a maximum radius and the curve angle covered (traveled through by the vehicle) is greater than or equal to a minimum angle.

An autocalibration unit is configured to perform autocalibration. Autocalibration is performed if at least one cornering maneuver suitable for autocalibration has been identified. Autocalibration proceeds taking account of movement of stationary objects in the surroundings of the vehicle in the image sequence or in the image sequences of one or more cornering maneuvers suitable for autocalibration.

The apparatus or the control device and/or the input, driving geometry estimation and/or autocalibration unit may in particular comprise a microcontroller or processor, a digital signal processor (DSP), an ASIC (Application Specific Integrated Circuit), an FPGA (Field Programmable Gate Array) and the like as well as software for carrying out the corresponding method steps.

The present invention may thus be implemented in digital electronic circuits, computer hardware, firmware or software.

The present invention also provides a vehicle with an apparatus according to the invention and a vehicle camera.

First of all, aspects of the solution are classified below in the context known from the literature.

Selected Literature:

[1] Hartley, Zissermann, Multiple View Geometry in Computer Vision, 2000, Cambridge University Press, ISBN: 0521623049 (first edition).

[2] Peter Sturm: Critical Motion Sequences for Monocular Self-calibration and Uncalibrated Euclidean Reconstruction, CVPR, 1997, pp. 1100-1105.

[3] C. Wu: Critical Configurations for Radial Distortion self-calibration. In CVPR, 2014.

Targetless calibration of cameras is well known in the literature [1]. The calibration methods are subdivided into methods for estimating a (more or less rough) starting solution of the parameters and methods for improving an available solution. The former methods are of an algebraic nature. Due to complex algorithms and poor robustness, they are only suitable for practical solutions in special cases. Furthermore, such methods are of low relevance for ADAS purposes, since in the ADAS world typically very good starting solutions are known from manufacturing. In the case of practical applications, operations are generally restricted for automotive purposes to improvement of a continuously estimated calibration, wherein the latest estimated parameters constitute a very good starting solution for the algorithms. The category of the optimal methods known as the "Gold Standard" [1] is known as bundle adjustment (in [1] the term "Gold Standard" is mentioned in section 10.4.1 in connection with bundle adjustment in algorithm 10.3).

In principle, the available literature covers the theoretical algorithmic prior art. For practical implementation, there is a series of non-trivial questions which have not to date been clearly answered in the literature. The problem with the prior art consists in "critical configurations". These may be regarded as an unfavorable assemblage of a camera model, a scene geometry and vehicle motion in which the bundle adjustment problem has no unambiguous solution or the true solution is close to an ambiguous solution. In all these cases, incorrect estimation of the intrinsic parameters may arise, which is in principle arbitrarily far away from the true parameters.

Peter Sturm describes in [2] a complete taxonomy of critical configurations for the autocalibration of a pinhole camera. It is apparent from this fundamental work that all movements in a plane (e.g. over a cornering maneuver) are critical for a pinhole camera, irrespective of the scene. However, a vehicle with an ADAS system in practice performs substantially planar movements at short time intervals (just a few seconds). To summarize, if the pure pinhole camera model is used for camera modeling, intrinsic autocalibration in a vehicle in a short time is nine times out of ten difficult, if not impossible.

After Peter Sturm (in the 1990s) only little attention has been paid in the literature to the problem of unambiguity of autocalibration for more complex camera models. Only paper [3] tackles critical configurations for radial distortions and an un-distortion function. The failures are partly due to the fact that there are no formal ways of investigating critical configurations.

BRIEF DESCRIPTIONS OF THE DRAWINGS

Figure 2:
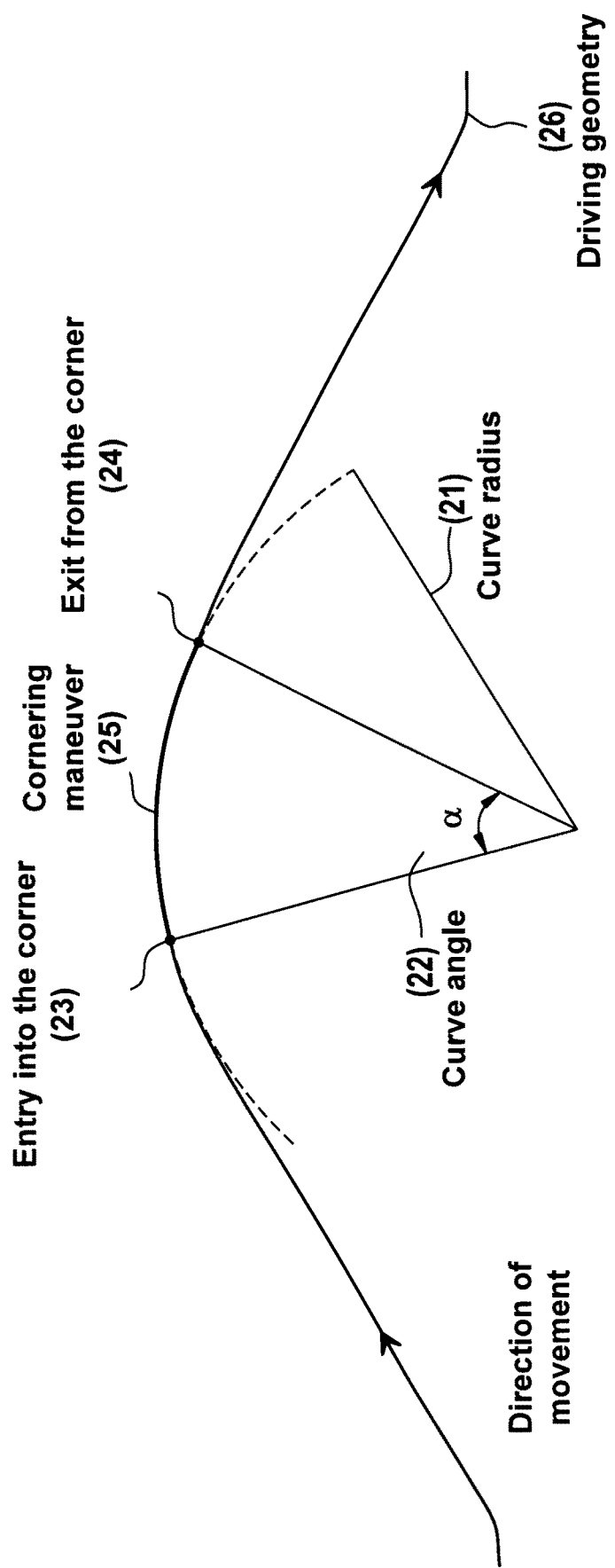

Exemplary embodiments are described below and certain aspects explained in greater detail with reference to figures, in which FIG. 1 is a schematic representation of an apparatus, e.g. a control device, and an autocalibration sequence in the control device, and FIG. 2 is a schematic representation of the geometry of the travel of a vehicle performing a cornering maneuver.

DETAILED DESCRIPTION OF EXAMPLE EMBODIMENTS OF THE INVENTION

A (vehicle) camera 1 which is directed roughly forwards is arranged fixedly in a vehicle, e.g. inside the vehicle behind a windshield. The objective lens (or the optical system) of the vehicle camera 1 receives optical radiation, which enters the objective lens from outside through the windshield and maps the optical radiation onto an image capture sensor (image sensor, image chip). The vehicle camera 1 captures a sequence of images of the surroundings in front of the vehicle. As the vehicle moves through a traffic scenario, the captured images change as a result of the intrinsic motion of the vehicle and as a result of the movement of objects located in the detection zone of the vehicle camera 1.

The captured images are transferred to a control device 11 (or a processing unit). The control device 11 may be integrated into the vehicle camera and may comprise a memory 10. The control device 11 is configured to perform a bundle adjustment 8 method. The control device 11 receives data from a corner sensor (i.e. curve sensor) 2 or an apparatus for estimating driving geometry.

The corner sensor (i.e. curve sensor) 2 may be a component of the control device 11, in particular since the intrinsic motion of the vehicle (and thus also of the vehicle camera 1 mounted in the vehicle) may be reconstructed or estimated from the image sequence of the vehicle camera 1. Alternatively, the corner sensor may comprise a yaw rate sensor and/or velocity sensor, which may be integrated and arranged in the vehicle camera 1, in the control device 11 or at another point in the vehicle, e.g. in the vehicle sensor cluster of an electronic braking system. As an alternative or in addition to the yaw rate sensor, a steering angle sensor or indeed a transverse acceleration sensor may also serve as a corner sensor for identifying and characterizing a cornering maneuver (i.e. curve travel of the vehicle along a curved path).

The vehicle camera 1 is installed in a vehicle such that it looks forwards. The vehicle camera 1 supplies images to the control device 11 at chronologically defined intervals. In one embodiment, the vehicle camera 1 and the control device 11 may be integrated into a common housing, or the control device 11 is simultaneously the camera control device.

The corner sensor 2 is likewise installed in the vehicle, such that it sends information about current velocity and yaw rate to the control device 11. In one embodiment, the corner sensor 2 may be integrated in the control device 11. In one further embodiment the corner sensor 2 may use image data from the vehicle camera 1, exclusively or in addition to other image data, represented by the dashed arrow in FIG. 1 (and data from further calculation steps) to determine the yaw rate.

The control device 11 contains first and second image memories 3, 4 for two successive images at the points in time t and t−1 respectively (or vice versa). The two images are provided at the point in time t to an optical flow estimator 6, resulting in the "temporal flow" from t−1 to t. This describes the motion of the pixels of the objects (infinitesimally small points in space) in the scene from time t−1 to t. The optical flow is tracked over time in a flow tracker (7), dynamic objects are filtered out and outliers eliminated. As a result, tracks of points are obtained which track one and the same object over a plurality of images.

The information from the corner sensor 2 is processed in the control device 11 by a driving geometry estimator 5. As symbolized by the small dashed arrow in FIG. 1, the optical flow estimator 6 may supply data to the driving geometry estimator 5.

The outcome of this step is, in addition to an estimation of travel motion 26 in the plane, a decision as to whether the current journey portion is a cornering maneuver 25.

FIG. 2 will now be used to describe the characterizing features of a cornering maneuver 25. The line in the figure represents the driving geometry 26 of a vehicle in a plane. The arrows on the driving geometry line indicate direction of movement (in FIG. 2 substantially from left to right). At the start, travel proceeds straight ahead, until a corner 23 is entered at a first point (reference sign 23). This entry into the corner 23 may be identified from a change in yaw rate. The actual cornering maneuver 25 then takes place, ending at a second point (reference sign 24) by means of the exit from the corner 24.

The cornering maneuver 25 is associated with a curve radius 21. With a "sharp" corner, the curve radius is correspondingly small. The curve radius 21 may be determined by approximation of a circle to the cornering maneuver portion 25 (dashed line in FIG. 2). Also associated with the cornering maneuver 25 is a curve angle α (reference sign 22), which indicates the curve angle 22 (relative to the segment of the approximated circle) covered by the driving geometry 26 during the cornering maneuver 25.

In FIG. 1, therefore, the information about a cornering maneuver 25, supplied by the corner sensor 2 and/or the optical flow estimator 6, passes to the driving geometry estimator 5.

If the covered angle (curve angle 22) is sufficiently large (e.g. greater than 60 degrees) and the radius (curve radius 21) is sufficiently small (e.g. less than 40 m), the data from the journey portion are forwarded to the bundle adjustment algorithm 8. This ensures that the image sequence on which the autocalibration is carried out or the image sequence(s) which form(s) the basis of the autocalibration encompass(es) a sufficiently sharp and long cornering maneuver 25. This is shown in FIG. 1 in that the t, t−1, t−2 etc. tracks determined by the flow tracker 7 and the estimated driving geometry are incorporated into a corner 9 decision module, which is constantly verifying whether a sufficient sharp and long cornering maneuver is currently taking place. If this is the case, the corresponding data are used for autocalibration of the vehicle camera 1. If this is not the case, estimation of the driving geometry 5 and of the optical flow 6 is continued in subsequent images of the image sequence, as is tracking of the optical "flows" (in the flow tracker 7).

In one embodiment, the information of the corner sensor is determined from the essential geometry between individual frames. An individual image of an image sequence is referred to as a frame.

The bundle adjustment algorithm 8 takes as starting solution either the latest calculated result or the estimation of the parameters of the vehicle camera from the manufacturing process and refines this with the current obtained flow tracks t, t−1, t−2 etc. which were determined during the cornering maneuver 25.

The method (8) may proceed as described in [1] Appendix A4. The method is discussed in detail therein substantially on page 580, section A4.6. Reference is additionally made to sections 8, 10 and 11 to assist in understanding the context of Appendix A4. If the projection model of the camera is given by the parameterizable map k, each pixel p_ij at the ith spatial point s_i in the view j with the extrinsic parameters theta_j and the intrinsic parameters int fulfills the equation $$p\_ij = k(s\_i, \text{theta}\_j, \text{int}).$$

It is here assumed that the unknown intrinsic parameters int remain constant during travel, such that merely the theta_j differ from view to view. Now taking the information obtained from the driving geometry estimator 5, this constitutes a very good starting solution for theta_j. The rest of the method follows by (local) minimization of the bundle adjustment problem $$l(s\_i, \text{theta}\_k, \text{int}) = \text{sum}\_{ij} \| p\_ij - k(s\_i, \text{theta}\_j, \text{int}) \|^2$$

for all unknowns, i.e. the spatial points, camera poses, and the intrinsic parameters. Minimization proceeds using standard methods of nonlinear optimization. In one embodiment of the invention, for example, it is possible to use the Levenberg-Marquardt method.

The result of the calculation of the bundle adjustment method is refined vehicle poses, a reconstruction of the spatial surroundings of the motionless scene, and the refined intrinsic parameters. The schematically represented method may be made more robust by way of numerous modifications [1]. The results of the optimization may be refined in one embodiment of the invention by averaging or filtering. In this way, owing to the characteristics of the method an accuracy can be achieved after only a small number of filtering steps which is equivalent to the current manufacturing prior art.

It is very advantageous for the success of the described method (in particular the bundle adjustment 8) if the vehicle camera 1 has certain characteristics. Preferably, the vehicle camera 1 (and thus the camera model, i.e. the above-described parameterizable map k) has non-vanishing radial distortions [2]. The latter is not unusual for present-day cameras which may be installed in vehicles, but should be ensured when the vehicle camera 1 is selected. In one further advantageous embodiment, the vehicle camera 1 additionally has non-vanishing tangential distortions.

At the end of the calculation the result is additionally validated. The resultant calibration parameters of the vehicle camera 1 are saved in a memory 10 for further processing. The memory 10 may be integrated into the control device 11 or into the vehicle camera 1. The stored calibration parameters of the vehicle camera may be used in particular for image data evaluation (e.g. object recognition, character/pattern/marking recognition, intrinsic motion estimation) for ADAS functions or other vehicle functions.

The invention claimed is:
1. A method of autocalibration of a vehicle camera comprising the steps:
 a) from the vehicle camera, acquiring a series of images of a region of surroundings in front of the vehicle,
 b) detecting a cornering maneuver of the vehicle suitable for autocalibration, when a curve radius described by the vehicle during the cornering maneuver is less than or equal to a maximum radius and a curve angle traversed by the vehicle during the cornering maneuver is greater than or equal to a minimum angle, and
 c) performing autocalibration, when at least one said cornering maneuver suitable for autocalibration has been detected, wherein the autocalibration takes account of movement of stationary objects in the surroundings of the vehicle in one or more of the series of images acquired during one or more of the cornering maneuvers suitable for autocalibration.

2. The method according to claim 1, wherein in step the autocalibration proceeds on an assumption of a planar movement of the vehicle camera.

3. The method according to claim 1, wherein the autocalibration comprises use of a bundle adjustment method.

4. The method according to claim 1, wherein the vehicle camera has an optical system which is configured such that during imaging of the surroundings radial distortions occur which do not fall below a predefined magnitude.

5. The method according to claim 1, wherein the autocalibration supplies intrinsic and extrinsic parameters of the vehicle camera.

6. The method according to claim 1, wherein the maximum radius amounts to 40 meters.

7. The method according to claim 1, wherein the minimum angle amounts to 60° or 90°.

8. The method according to claim 1, further comprising verifying whether the vehicle camera moves in a plane, taking account of a pitch and/or a roll of the vehicle camera or of the vehicle.

9. The method according to claim 1, wherein the detecting of the cornering maneuver and optionally also a pitch and/or roll detection proceeds based on evaluation of the series of images.

10. The method according to claim 1, wherein the detecting of the cornering maneuver and optionally also a pitch and/or roll detection proceeds based on vehicle sensor data.

11. The method according to claim 1, wherein the autocalibration provides calibrated values of intrinsic parameters of the vehicle camera.

12. An apparatus for autocalibration of a vehicle camera, comprising:
 a) an input device configured to receive and provide a sequence of images acquired by the vehicle camera of a region of surroundings in front of the vehicle,
 b) a driving geometry estimation device configured to detect a cornering maneuver of the vehicle suitable for autocalibration, when a curve radius described by the vehicle during the cornering maneuver is less than or equal to a maximum radius and a curve angle traversed by the vehicle during the cornering maneuver is greater than or equal to a minimum angle, and
 c) an autocalibration device configured to perform autocalibration, when at least one said cornering maneuver as suitable for autocalibration has been detected, wherein the autocalibration takes account of movement of stationary objects in the surroundings of the vehicle in one or more of the sequence of images acquired during one or more of the cornering maneuvers suitable for autocalibration.

13. The apparatus according to claim 12, wherein the autocalibration device is configured so that the autocalibration provides calibrated values of intrinsic parameters of the vehicle camera.

14. A vehicle comprising a vehicle body, and mounted thereon a vehicle camera and an apparatus for autocalibration of the vehicle camera, wherein the apparatus comprises:
 a) an input device configured to receive and provide a sequence of images acquired by the vehicle camera of region of surroundings in front of the vehicle,
 b) a driving geometry estimation device configured to detect a cornering maneuver of the vehicle suitable for autocalibration, when a curve radius described by the vehicle during the cornering maneuver is less than or equal to a maximum radius and a curve angle traversed by the vehicle during the cornering maneuver is greater than or equal to a minimum angle, and
 c) an autocalibration device configured to perform autocalibration, when at least one said cornering maneuver suitable for autocalibration has been detected, wherein the autocalibration takes account of movement of stationary objects in the surroundings of the vehicle in one or more of the sequence of images acquired during one or more of the cornering maneuvers suitable for autocalibration.

15. The vehicle according to claim 14, wherein the autocalibration device of the apparatus is configured so that the autocalibration provides calibrated values of intrinsic parameters of the vehicle camera.

* * * * *

UNITED STATES PATENT AND TRADEMARK OFFICE
CERTIFICATE OF CORRECTION

PATENT NO.         : 10,554,951 B2
APPLICATION NO.    : 16/361586
DATED              : February 4, 2020
INVENTOR(S)        : Aless Lasaruk et al.

It is certified that error appears in the above-identified patent and that said Letters Patent is hereby corrected as shown below:

In the Specification

Column 7,
Line 46, after "maneuver", insert --25--;

In the Claims

Column 9,
Claim 2, Line 1, after "in step", insert --c)--;

Column 10,
Claim 12, Line 5, before "suitable", delete "as";
Claim 14, Line 19, after "camera of", insert --a--.

Signed and Sealed this
Nineteenth Day of May, 2020

Andrei Iancu
*Director of the United States Patent and Trademark Office*